US010150584B2

(12) United States Patent
Schiavina

(10) Patent No.: US 10,150,584 B2
(45) Date of Patent: Dec. 11, 2018

(54) APPARATUS WITH FACING BELL MEMBERS, FOR MODIFIED ATMOSPHERE PACKAGING OF PRODUCTS PLACED IN TRAYS

(71) Applicant: GRUPPO FABBRI VIGNOLA S.P.A., Vignola (IT)

(72) Inventor: Andrea Schiavina, Correggio (IT)

(73) Assignee: GRUPPO FABBRI VIGNOLA S.P.A., Vignola (IT)

( * ) Notice: Subject to any disclaimer, the term of this patent is extended or adjusted under 35 U.S.C. 154(b) by 385 days.

(21) Appl. No.: 14/397,690

(22) PCT Filed: Oct. 4, 2013

(86) PCT No.: PCT/EP2013/070743
§ 371 (c)(1),
(2) Date: Oct. 29, 2014

(87) PCT Pub. No.: WO2014/056806
PCT Pub. Date: Apr. 17, 2014

(65) Prior Publication Data
US 2015/0210413 A1   Jul. 30, 2015

(30) Foreign Application Priority Data
Oct. 9, 2012  (BO) .................. BO2012A000549

(51) Int. Cl.
*B65B 31/02*       (2006.01)
(52) U.S. Cl.
CPC ................. *B65B 31/028* (2013.01)
(58) Field of Classification Search
CPC ....... B65B 31/028; B65B 59/04; B65B 31/02; B65B 31/00; B65B 31/04; B65B 7/162; B65B 7/16; B65D 77/12; B65D 81/20
(Continued)

(56) References Cited

U.S. PATENT DOCUMENTS

| 3,481,100 A | 12/1969 | Bergstrom |
| 3,992,850 A | 11/1976 | Vetter |

(Continued)

FOREIGN PATENT DOCUMENTS

| DE | 2335021 | 1/1975 |
| JP | 352042161 | 3/1977 |
| WO | WO2011124548 | 10/2011 |

OTHER PUBLICATIONS

International Search Report and Written Opinion for International Application No. PCT/EP2013/070743; dated Dec. 13, 2013; 8 pages.

*Primary Examiner* — Thanh Truong
*Assistant Examiner* — Xavier A Madison
(74) *Attorney, Agent, or Firm* — Stetina Brunda Garred and Brucker

(57) ABSTRACT

Methods and apparatus for introducing a modified atmosphere into a package and sealing that package with a film are disclosed. Cooperating upper and lower bell members having internal volumes in fluid communication with one another via a duct configured to cause sequential pressure differentials between the volumes permit the sealing film to be controllably retracted from and applied to outflow holes so as to allow evacuation of ambient air using a single constant vacuum source, rather than requiring precision timing controls and/or multiple vacuum sources. Another dedicate circuit introduces the modified atmosphere into the package, and a sealing unit such as a heat welder subsequently seals the film against the package.

16 Claims, 3 Drawing Sheets

(58) Field of Classification Search
USPC .......................................................... 53/541
See application file for complete search history.

(56) References Cited

U.S. PATENT DOCUMENTS

| | | | | |
|---|---|---|---|---|
| 5,479,759 A | * | 1/1996 | Gorlich | B65B 25/067 |
| | | | | 53/298 |
| 6,912,828 B1 | * | 7/2005 | Yamay | B65B 31/028 |
| | | | | 53/300 |
| 2012/0285126 A1 | * | 11/2012 | Vaccari | B65B 31/028 |
| | | | | 53/510 |
| 2014/0260086 A1 | | 9/2014 | Schiavina | |

* cited by examiner

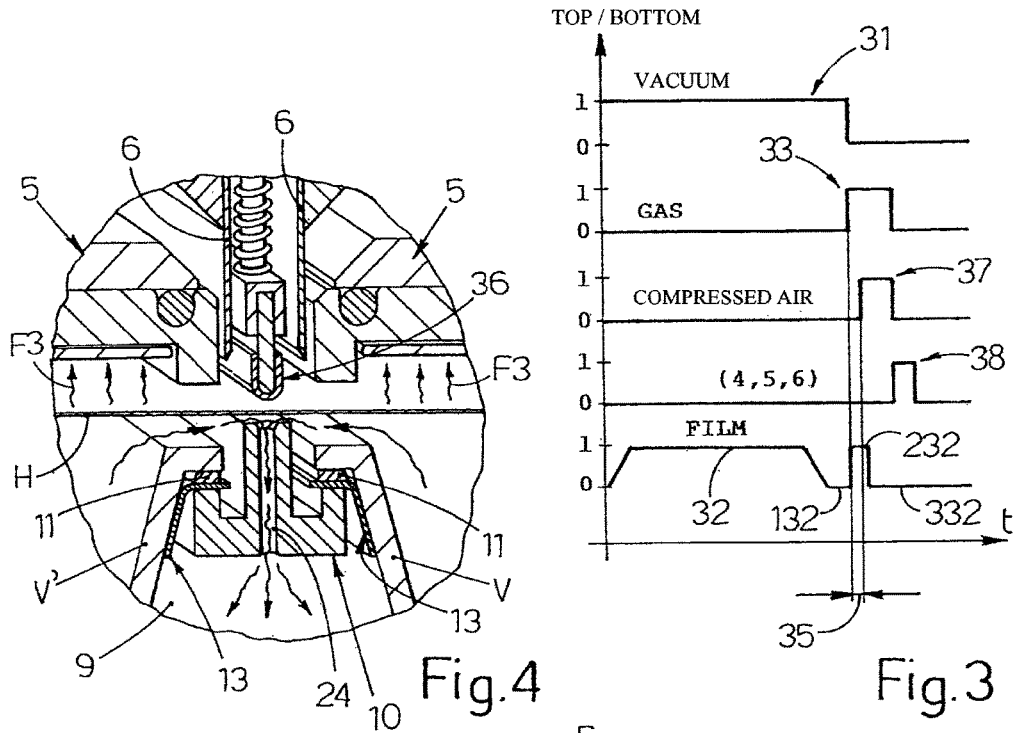
Fig. 4
Fig. 3
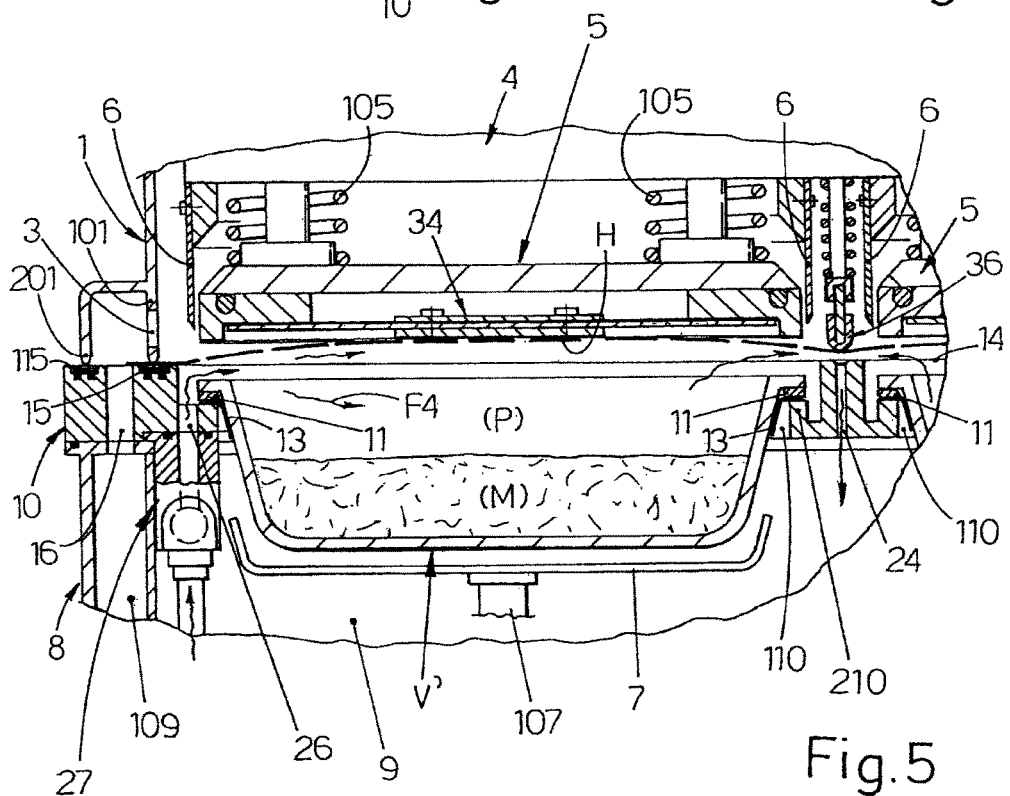
Fig. 5

APPARATUS WITH FACING BELL MEMBERS, FOR MODIFIED ATMOSPHERE PACKAGING OF PRODUCTS PLACED IN TRAYS

CROSS REFERENCE TO RELATED APPLICATIONS

The present application claims priority to PCT International Application No. PCT/EP2013/070743 filed on Oct. 4, 2013, which claims priority to Italian Patent Application No. BO2012A000549 filed Oct. 9, 2012, the entirety of the disclosures of which are expressly incorporated herein by reference.

STATEMENT RE: FEDERALLY SPONSORED RESEARCH/DEVELOPMENT

Not Applicable.

BACKGROUND OF THE INVENTION

The invention refers to those systems or apparatus that sealingly weld a closing film on at least one tray containing a product to be packaged. The apparatus according to the invention is of the type with facing bell members, classifiable in IPC B65B31/04, capable of producing packages of the kind known as MAP (Modified Atmosphere Packages), in which the product is enclosed inside a sealed package containing a modified atmosphere useful to improve the preservation of the product, without any substantial difference in pressure between inside and outside. In order to modify the atmosphere inside the pack, in a step in which the barrier film is placed over the product placed in the tray for subsequent closing, kept at a suitable distance from the perimeter edge of the same tray, the air is firstly removed from the inside of the tray and then replaced with a modified atmosphere, for example based on nitrogen, carbon dioxide, oxygen and/or other gases. The prior art closest to the invention is described in the Italian patent application No. BO2011A-000403 dated Jul. 6, 2011, in the name of the same Applicant, which refers to an apparatus comprising a top bell member which is open downwards, usually containing the welding means and also the means for cutting the barrier film for closing the trays and comprising a bottom bell member, facing the preceding bell member and open in this direction, with a chamber and with a seat for housing at least one tray which may be inserted into and extracted from the said seat by specific means, comprising means for cyclic positioning of an extended portion of film between the said two open bell members and above the trays placed in the bottom bell member, which also comprises means for moving the said bell members towards each other, to close between them the edge of the tray and over this said film and comprising means for performing in this sequence the steps of extraction of the air from the tray and introduction of process gases therein for preservation of the produced place in the tray before to the subsequent step of welding of the film on the edge of the same tray and cutting of the perimeter of the portion of film welded to the same tray. This apparatus comprises means for ensuring that during the step for mutual closing of the bell members, these form therein a main chamber defined at the top by the film for covering the tray, at the bottom by the same tray with the product and at the side by any interface structure that surrounds and connects the perimeter of the said film to the perimeter of the top edge of the tray and on the structure of which holes or slots are provided, suitably distributed and positioned on the outside of the perimeter of the tray and communicating with the said main chamber. In the same apparatus according to the prior art indicated above, when the two bell members are closed, two volumes, which do not directly communicate which each other, are formed inside the said bell members, a first volume formed by the said main chamber, with the tray and with the covering film, and a second volume formed by the internal intercommunicating chambers of the said two bell members. Some of the holes of the said interface structure open out substantially along a portion or side of the tray and are connected to a first header or circuit located in the bottom bell member, while other said holes open out along at least one portion or opposite side of the same tray and are connected to a second header or circuit also located inside the bottom bell member, whereas the internal chambers are connected to one another and to at least a third circuit, Means are provided such that, via the said first and second header or circuit, connected to the said main chamber and via the said third circuit connected to the internal chambers of the two bell members, it is possible to produce MAP-type packages without having to previously form very high vacuums in the trays and limiting the use of process gases. An apparatus of this type has a certain degree of structural complexity, must be reprogrammed to vary the format of the trays and also requires complex calibration to balance the two volumes concerned in the step of introducing the process gas and the balancing step, in order to obtain packages always with the desired appearance.

SUMMARY OF THE INVENTION

The invention proposes a structural simplification of the apparatus in question, still producing them with a view to forming two volumes which do not communicate directly with each other, when the two bell members are closed and with three circuits, as stated in the prior art indicated above, but with a new solution that automates the balancing step and provides for the use of valve means, via which it is possible, in given situations, to automatically balance the pressure differences between the said two volumes. To obtain a solution to this technical problem, it was also necessary to solve the following ensuing problem: to ensure a separation with safe and reliable seal between the main chamber with the product and the internal chamber of the bottom bell member, as the current solutions that entrust this separation either to the edge of the tray and/or to gaskets that operate on the bottom face of the edge of the same tray have proved to be somewhat unreliable due to the fact that this edge is not always perfectly planar and due to the thrust, often insufficient and useful for the purpose, exerted by the weight of the product placed in the tray. The invention intends to solve the said main problem of the invention with the following idea for solution. The holes for outflow of the washing air and through which the vacuum in the main chamber of the tray is initially obtained, are raised to a level such as to be initially covered by the film covering the tray and these same holes communicate with the internal chamber of the bottom bell member. With this solution and with the other small circuit arrangements indicated below, it is possible to use the film as a membrane valve to open or close the said holes below to obtain, with the best result and completely automatically, the steps of depressurization, washing and pressurization with process gases of the main chamber with the internal volume of the tray. The said secondary problem is solved by providing, in each seat for housing a tray, a flexible lip seal gasket, which projects into the internal opening of each said seat, to cooperate with seal with the external lateral and usually inclined surface of the tray.

As prior art documents, the following documents are cited: WO 2011/124548 (D1); DE 23 35 021 (D2); JP S52 042 161 (D3); U.S. Pat. No. 3,992,850 (D4); U.S. Pat. No. 3,481,100 (D5). No means are provided in the device according to D1 to discontinue the communication between the main chamber end the internal chambers, which are always in indirect communication through holes, and not through valves. Starting from this document which is regarded as being the prior art closest to the subject-matter of the invention, the problem to be solved is that of further automatize the evacuation, gasification and compensation steps, without adding constructive complications. The document D2 shows a gas discharge element, which however is not a valve, in the sense that it cannot discontinue the communication between the main chamber and the internal chambers. The document D3 shows a valve which however is not used for putting into communication the main chamber with the internal chambers, rather to inject steam in the main chamber.

BRIEF DESCRIPTION OF THE DRAWINGS

Further characteristics of the invention, and the advantages deriving therefrom, will be more apparent from the following description of a preferred embodiment thereof, illustrated purely by way of non-limiting example, in the figures of the three accompanying drawings, wherein:

FIG. 3 schematically illustrates comparative diagrams of the operating steps of the main components of the apparatus;

FIG. 4 illustrates a perspective view of the central part of the apparatus closed as in FIG. 1 and in the step of forming the vacuum inside the trays;

FIG. 5 illustrates the left seat of the apparatus as in FIG. 1, in the step of washing and of injecting the process gases for preservation into the tray;

DETAILED DESCRIPTION OF THE INVENTION

Figure 1:
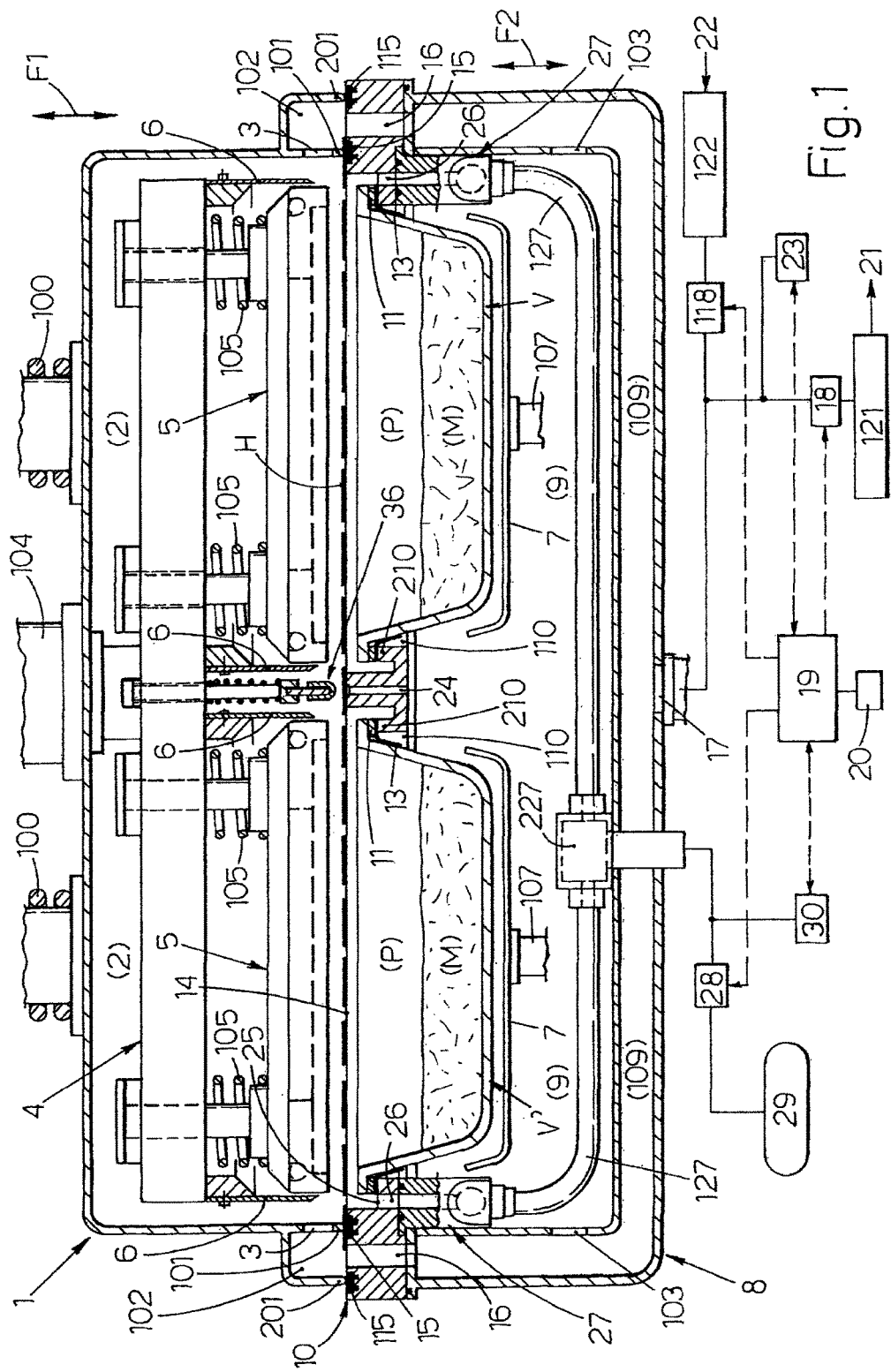
FIG. 1 is a cross-sectional view of the two facing bell members, in the first step of closing over the film and over the trays containing product to be conditioned and closed, with a schematic illustration of the circuit for conditioning the same trays and which controls operation of the same apparatus.

In FIG. 1, the numeral 1 indicates the top bell member with its inner annular edge 101 and with the outer and facing edges 201 defining together with the inner edge 101 facing chambers 102, which, via openings 3 provided on the same inner edge 101, communicate with the internal volume 2 of the bell member 1, which is connected to specific vertical guiding and raising-lowering means, schematically indicated by the double arrow F1 and not shown in detail, as they are known. Inside the bell member 1 there is positioned a plate 4, of known type, connected to specific and selective raising and lowering means 104 and which with interposed respective guiding and spring means 105, supports at the bottom heat-welding units 5 and carries cutting means 6 that externally surround each sealing unit 5 and that are normally retracted from the bottom useful edge of these components 5. The bell members illustrated in FIG. 1 are such as to be able to operate simultaneously on two parallel rows of trays V, and V', while it is understood that the scope of protection of the invention also includes bell members capable of operating on more than two rows of trays, or on a single row of trays or a single tray, all in a manner deducible and easily obtainable by those skilled in the art. The numeral 100 denotes known means that dampen closing of the top bell member 1 on the bottom bell member, indicated below. The heat-weldable barrier film H, with which the preformed trays V, V' filled with the product M are to be sealingly closed, passes underneath the bell member 1; the trays are positioned by any suitable means under the same bell member 1, resting on extractors 7 of known type associated with the bottom bell member 8, with respective guiding and movement means 107. The bottom bell member 8 is itself connected to specific known raising and lowering means, represented schematically by the double arrow F2, and is provided with an internal chamber 9 having a shape and size suitable to house the extractors 7 with the trays V, V' when the same bell member is raised (see below) and this chamber 9 is closed at the top by a horizontal frame 10, provided with mouths or seats 110 of a shape correlated with that of the trays, on the perimeter edges 210 of which the edges of the same trays are intended to rest and at the centre of which the extractors 7 operate; in the raised position the extractors receive the trays, are then lowered to insert the same trays into the seats 110, with perfect self-centring thereof with respect to the various components of the bell members 1 and 8, and at the end of the cycle are raised again to prepare the same closed trays for the step of removal and replacement with new trays to be closed.

In the prior art, on the edges 210 of the seats 110 there can be provided annular gaskets, made of elastomeric material, on which the lower side of the edges of the trays rested, also to ensure sealed separation between the internal chambers of the bell members 1 and 8 when in closed position. As this separation was difficult to achieve, for the reasons specified above, the invention proposes a solution to this technical problem by fixing on the edge 210 of the seats 110, for example via a small frame 11 and appropriately distributed fixing screws 12, an annular gasket 13, flat and flexible, for example made of silicone rubber, which projects with a lip seal and with the right portion inside each seat 110, which is preferably provided in the corner areas with recesses 113, arched and connected with the appropriate connection to the consecutive portions of the same gasket, which in this way is capable of uniting, intimately and with perfect seal, the top or medium-top lateral part of the tray and of ensuring the desired conditions of sealed separation of the internal chambers of the two bell members via the seats 110 and the trays inserted therein. The gasket 13 as described above has proved to be very effective for sealing purposes and such as to facilitate both insertion and removal of the tray into and from the same gasket 13, without it being subject to undesirable deformation and/or wear from friction and from the thrusts of the tray. At a higher level to that of the edges of the tray when they are resting on the edge 210 of the seats 110, the lower bell member 8 has a horizontal surface 14 with a closed annular gasket 15 with which the edge 101 of the upper bell member 1 cooperates in the closed position and the same surface 14 has facing extensions, onto which there open out slots 16 surrounded by portions of the said gasket 15 and by supplementary gaskets 115, with which the external edge 201 of the upper bell member cooperates with seal so that, via the chambers 102, the openings 3 and the slots 16, the internal chamber 2 of the top bell member 1 communicates directly and preferentially with a duct 109 associated with the bottom bell member 8, which with its ends communicates with the said slots 16 and which is provided with calibrated openings 103 for connection with the chamber 9 of the same bottom bell member. The duct 109 is provided with a mouth 17, which via intercepting units with valves means 18, 118, controlled by a processor 19, can be connected disconnected to or from a buffer 121, in turn connected to a vacuum forming pump 21, or to and from a buffer 122 with related pump 22, for the controlled supply of filtered air at the appropriate pressure (see below). A pressure switch or vacuum switch 23, which sends its data to the processor 19, is branched off the circuit coupled to the duct 17. The numeral 20 denotes a unit for programming and optionally interrogating and controlling the processor 19 and the various components coupled to it. From FIGS. 1 and 2 it can be seen that the portion of surface 14 of the frame 10 of the bottom bell member, which is positioned between the two rows of seats 110, is provided with rows of holes 24, which preferably have a larger diameter and are greater in number on the said portions of surface positioned at the nodes or intersections of the two rows of seats 110, for example arranged in several parallel rows, as indicated with 124. Optional specific holes 224 can also be provided on the ends of the flat portions 14 orthogonal to those carrying the said holes 24. 124. All the holes 24, 124 are suitably flared at the top end and at the bottom communicate freely with the internal chamber 9 of the bottom bell member. For correct operation of the apparatus the sum of the sections of the holes 24, 124 is less than the sum of the sections of the slots 16 with the openings 3 for connection between the internal chambers 9 and 2 of the bell members 1 and 8 (see below) and the sum of the sections of the openings 103 is less than the sum of the sections of the slots 16 with the said openings 3, so that the flow in the duct 109 is in preferential connection with the internal chamber 2 of the top bell member 1. As a result of this preferential connection, the vacuum or pressure conditions that are created in the duct 109 extend rapidly to the chamber 2 of the top bell member and with a delay also extend to the chamber 9 of the bottom bell member. It is understood that the circuit solution 17, 109, 103, 9, 16, 3, 2 illustrated in FIG. 1 is provided purely by way of non-limiting example and can be widely modified, also as a function of structural requirements, without departing from the scope of the invention. From FIGS. 1 and 2 it can also be seen that each seat 110 for housing a tray is surrounded by an annular and recessed groove 25, which in one or more areas facing or at a suitable distance from the rows of holes 24, 124, is in turn provided with holes 26 connected to headers 27 positioned inside the bell member 8 and which via branched lines 127 are in turn connected to a centralized mouth 227 connected to an intercepting unit 28, in turn connected to a buffer 29 for supplying the process gases to be introduced into the trays and a pressure switch and/or vacuum switch 30, which also sends its data to the processor 19, is provided branched off to the same mouth 227. The apparatus functions as described below.

Figure 2:
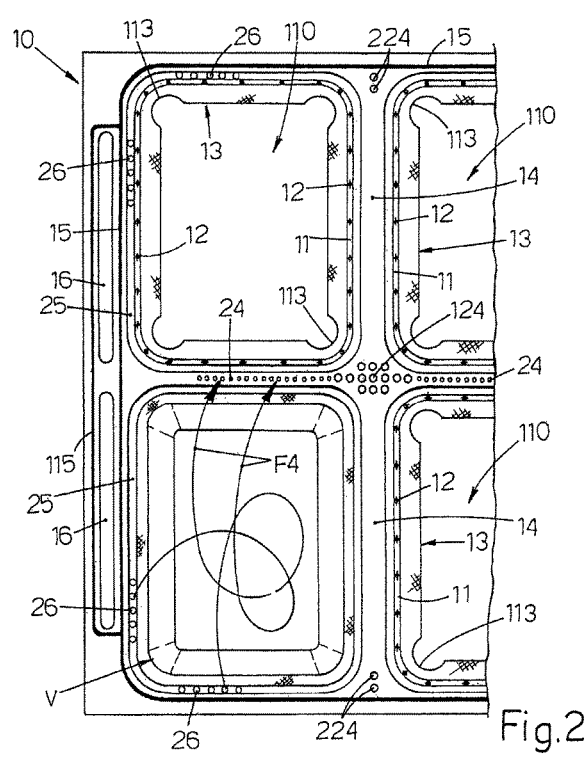
FIG. 2 is a top view of the bottom bell member with the seats for housing the trays illustrated partly empty and partly loaded with the related tray.
Figure 6:
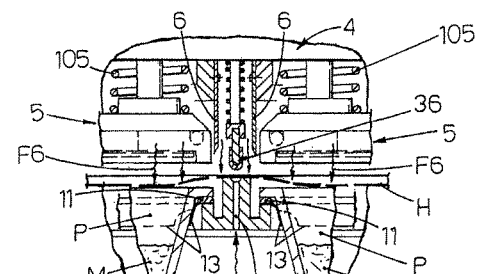
FIGS. 6 and 7 illustrate the central part of the apparatus, as in FIG. 4, respectively in the step of injecting the process gases into the tray and in the step of lowering the means of the top bell member that carry the welding and cutting means for welding and cutting the film on the top edge of the trays.
Figure 7:
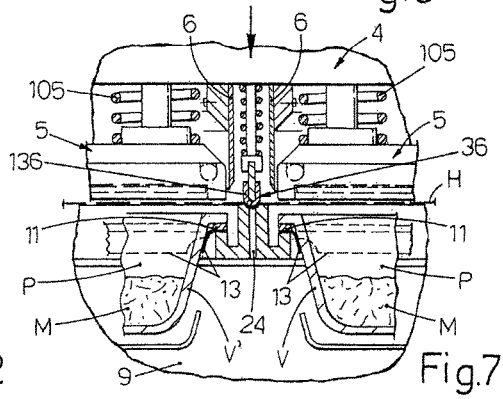

During an intermediate and initial step of the operating cycle, the apparatus is in the condition shown in FIG. 1. The trays V, V' with the product M are inserted in the seats 110 of the bottom bell member 8; with their body they cooperate with the gaskets 13 now deflected downward and which touch with seal the outer body of the same trays, which their top edge rest on the frame 11 that fixes the same gaskets 13 in place. The bell members 1 and 8 are closed against each other with the edges 101, 201 touching the gaskets 15, 115 with seal, and with a portion of barrier film H gripped between the gasket 15 of the bottom bell member and the edge 101 of the top bell member. The film H is suitably raised off the trays V, V' as positioned in seats 110 retracted with respect to the top surface 14 of the bottom bell member, on which surface 14 the same film rests and is thus positioned over all of the holes 24, 124 and touches the flared top end thereof. In this way, between the bottom face of the film H and the trays V, V' main chambers P are produced, communicating freely only with the holes 26, as these chambers P are separated from the internal chambers 2 and 9 of the bell members by the film H that surmounts and closes all the holes 24, 124. In a first step of the operating cycle, the intercepting means 28 are closed and the processor 19 controls opening of the intercepting means 18 and connection of the mouth 17 to the suction means 22, 122, with consequent activation of the suction step 31 (FIG. 3) of the air from the internal chambers 9 and 2 of the bell members. As a large part of the lower face of the film H is covered by the trays V, V', isolated from the chamber 9 by the action of the annular gaskets 13 and due to the more direct connection of the duct 109 with the chamber 2 of the top bell member, a vacuum is rapidly created in the same chamber 2, which tends to raise the film H, as indicated by the arrows F3 in FIG. 4 and by step 32 of FIG. 3 and this raising action causes opening of the holes 24, 124, with the result that via these open holes the main chambers P of the trays are placed in communication with the chamber 9 of the bottom bell member, which is also under suction, and the remaining air is rapidly removed therefrom. When the vacuum pressure values on the opposite faces of the film H are equal, the film returns to its original lower position, as indicated by step 132 of FIG. 3. The suction step 31 can be predetermined in terms of time (see below) and is controlled by the processor 19, also via the instruments 23 and 30. At the end of the step 31 and after closing of the intercepting means 18, the step 33 of introducing the process gases into the trays takes place, with opening of the intercepting means 28 of FIG. 1. The process gases enter the trays via the holes 26 and thrust the film H upwards, as indicated in step 232 of FIG. 3 and as illustrated in FIG. 5, carrying the same film into contact with stop means 34 housed in a specific bottom recess of the welding means 5 and into contact with the flexible elastic gasket 136 of a spring press 36, positioned on the plate 4, over the holes 24, 124 and which shall be specified below. As a result of raising of the film H into a dome, a vertical flow, indicated schematically by the arrows F4 in FIG. 2, is created in the main chamber P of the trays and gradually saturates this chamber P and performs the washing step, pushing the air remaining in the various chambers P to exit through the holes 24, 124 not intercepted by the same film H which is in a high position. After a correct time interval 35 (FIG. 3) from the start of the step for introducing gases inside the packages, the intercepting means 118 (FIG. 1) that connects the compressed air source 22, 122 with the internal chambers 9 and 2 of the bell members are opened carry out the balancing step, indicated with 36 in FIG. 3. The balancing air has a pressure higher than the ambient pressure (see below), so that due to the preferential circulation guaranteed by the internal free passages 16 and 3 between the bell members, on account of the limited total section of the holes 24, 124 and on account of the gaskets 13 that separate the main chambers P from the internal chamber 9 of the bottom bell member, the same balancing air forms in the volume 2 and consequently on the top face of the film H, a pressure higher than the pressure in the main chamber P, generating the action indicated in FIG. 6 by the arrows F6, which moves the same film H downwards, with substantial immediate closing of the holes 24, 124, preventing the balancing air present in the chamber 9 of the bottom bell member from rising via the same holes 24, 124, from reaching the inside of the trays and from polluting them. In close sequence of steps, the volume 9 of the bottom bell member is also filled with balancing air, until reaching the same pressure as the volume 2 of the top bell member. The action F5 (FIG. 6) generated through the holes 24, 124 by the pressure of the balancing air present in the bottom chamber 9, is not able to raise the film H as generated by the same pressure values but incident on a smaller area of the same film, the area covering the holes 24, 124, while the action F6 occurs on the whole of the top face of the same film H. In this sequence of steps, the plate 4 is lowered as in step 38 of FIG. 3, so that the press 36 firmly closes the holes 24, 124 as indicated in FIG. 7 and the film is then heat-welded to the edge of the trays by the welding means 5 and, finally, the welded portion of film is separated from the scraps by the action of the cutting means 6. In this sequence, the switching units 28, 118 of FIG. 1 are closed, the bell members 1 and 8 are opened, the closed trays are raised by the extractors 7, removed and replaced by new trays to be closed, the film H moves forward to be positioned with a new portion thereof over the new trays, and the cycle described above is repeated.

The operating procedure of the apparatus as described can be summarised with the sequence of the following operating steps, already considered above with reference to the diagrams of FIG. 3 and, for example, with the following operating values, which are indicated purely by way of non-limiting example, as they are easily deducible through experiments:

a step 31 of applying the vacuum in the internal chambers 9, 2 of the two closed bell members 1, 8, for example of −890 mbar, for a time of around 3000 msec, also to remove air from the main chambers P of the trays V, V';

at the end of the said vacuum step 31, the step 33 is activated of introducing process gases into the main chamber P of the trays, via the dedicated holes 26 and the related circuits. This step lasts, for example, around 360 msec and supplies the said gases from the buffer 29 at the pressure of around 2.5 bar. During this step, the residual air of the main chambers P of the trays is discharged into the chamber 9 of the bottom bell member via the dedicated holes 24, 14 left free by the film H which is temporarily raised;

after around 150 msec from the start of the said step 33 of introducing process gases, the step 37 starts, for supplying compressed air from the buffer 122, at the pressure of around 2.5 bar. This step lasts, for example, for around 300 msec and during this time the film H closes the holes 24, 124 which first connected the main chamber P of the trays with the internal chamber 9 of the bottom bell member 8, so as to prevent any form of pollution of the said chamber P;

in sequence, following steps 33, 37 of supplying process gases and of external balancing with compressed air, the step 38 takes place for lowering the unit carrying the said press 36 to close the said holes 24, 124 and which subsequently carries the welding means 5 to weld the film H on the top edge of the tray and which finally carries the cutting means 6 to cut and separate from the film the portion thereof welded on the same tray. It is once again understood that the values indicated above are purely indicative and non-limiting and that the description refers to a preferred embodiment of the invention, to which numerous variants and structural modifications can be made, all without departing from the informing principle of the invention, as described, illustrated and as claimed below. In the claims the references indicated in brackets are purely indicative and do not limit the scope of protection of the same claims.

What is claimed is:

1. An apparatus for introducing a modified atmosphere into a package and sealing that package with a film, the apparatus comprising:

an upper bell member and a lower bell member, at least one of the upper bell member and lower bell member being configured to traverse so as to transition the apparatus between an open position and a closed position, wherein in the closed position, a periphery of the upper bell member engages with a periphery of the lower bell member;

two chambers located on opposite sides of the periphery of the upper bell member, each of the two chambers being defined by an inner edge and an outer edge, each of the two chambers being configured to fluidly communicate through first openings with an internal volume of the upper bell member;

a duct associated with the lower bell member, the duct being in fluid communication through second openings with an internal volume of the lower bell member, the duct being placeable in fluid communication with a vacuum source and a compressed air source through a mouth, the duct being further configured to fluidly communicate through slots with each of the two chambers when the apparatus is in the closed position;

a horizontal surface of the lower bell member, the horizontal surface defining one or more outflow holes in fluid communication with the internal volume of the lower bell member;

at least one seat associated with the lower bell member for housing a package, the at least one seat having an upper perimeter recessed from the horizontal surface;

an annular groove associated with the lower bell member and positioned around the upper perimeter of the at least one seat, the annular groove being recessed from the upper perimeter of the at least one seat and being placeable in fluid communication with a source of modified atmosphere;

one or more presses associated with the upper bell member and being traversable independent of the upper bell member, the one or more presses being engageable with each of the one or more outflow holes of the horizontal surface when the apparatus is in the closed position;

a sealing unit associated with the upper bell member, the sealing unit being traversable independent of the upper bell member;

wherein when a package is housed in at least one of the at least one seat and a film is positioned between the upper and lower bell members, and the apparatus is subsequently transitioned to the closed position, the apparatus is operable to introduce a modified atmosphere into the package and to seal the film against the package via placement of the duct in fluid communication with the vacuum source for a first period of time, placement of the annular groove in fluid communication with the source of modified atmosphere for a second period of time, placement of the duct in fluid communication with the compressed air source for a third period of time, traversal of the one or more presses to engage each of the one or more outflow holes, and traversal of the sealing unit to contact and seal portions of the film against the package.

2. The apparatus of claim 1, wherein the duct is configured to reduce or increase the pressure within the internal volume of the upper bell member more rapidly than the pressure within the internal volume of the lower bell member when the duct is placed in fluid communication with the vacuum source or the compressed air source respectively.

3. The apparatus of claim 2, wherein the sum of the sections of the outflow holes is less than the sum of the sections of the first openings and of the slots, and the sum of the sections of the first openings and of the slots is greater than the sum of the sections of the second openings.

4. The apparatus of claim 1, wherein the at least one seat further comprises an annular gasket.

5. The apparatus of claim 1, wherein the one or more outflow holes defined by the horizontal surface are flared at their top end.

6. The apparatus of claim 1, further comprising one or more cutters associated with the upper bell member for separating away portion of the film sealed against the package, wherein the one or more cutters, the one or more presses, and the sealing unit are independently traversable of the upper bell member via being connected to a plate associated with and independently traversable of the upper bell member.

7. The apparatus of claim 1, wherein the sealing unit comprises a heat welder.

8. A method for introducing a modified atmosphere into a package and sealing that package with a film, the method comprising:
   providing an apparatus comprising:
      an upper bell member and a lower bell member, at least one of the upper bell member and lower bell member being configured to traverse so as to transition the apparatus between an open position and a closed position, wherein in the closed position, a periphery of the upper bell member engages with a periphery of the lower bell member;
      two chambers located on opposite sides of the periphery of the upper bell member, each of the two chambers being defined by an inner edge and an outer edge, each of the two chambers being configured to fluidly communicate through first openings with an internal volume of the upper bell member;
      a duct associated with the lower bell member, the duct being in fluid communication through second openings with an internal volume of the lower bell member, the duct being placeable in fluid communication with a vacuum source and a compressed air source through a mouth, the duct being further configured to fluidly communicate through slots with each of the two chambers when the apparatus is in the closed position;
      a horizontal surface of the lower bell member, the horizontal surface defining one or more outflow holes in fluid communication with the internal volume of the lower bell member;
      at least one seat associated with the lower bell member for housing a package, the at least one seat having an upper perimeter recessed from the horizontal surface;
      an annular groove associated with the lower bell member and positioned around the upper perimeter of the at least one seat, the annular groove being recessed from the upper perimeter of the at least one seat and being placeable in fluid communication with a source of modified atmosphere;
      one or more presses associated with the upper bell member and being traversable independent of the upper bell member, the one or more presses being engageable with each of the one or more outflow holes of the horizontal surface when the apparatus in the closed position; and
      a sealing unit associated with the upper bell member, the sealing unit being traversable independent of the upper bell member;
   housing a package in at least one of the at least one seat;
   positioning a film between the upper and lower bell members;
   transitioning the apparatus to the closed position;
   placing the duct in fluid communication with the vacuum source for a first period of time;
   placing the annular groove in fluid communication with the source of modified atmosphere for a second period of time;
   placing the duct in fluid communication with the compressed air source for a third period of time;
   traversing the one or more presses to engage each of the one or more outflow holes; and
   traversing the sealing unit to contact and seal portions of the film against the package.

9. The method of claim 8, wherein the duct is configured to reduce or increase the pressure within the internal volume of the upper bell member more rapidly than the pressure within the internal volume of the lower bell member when the duct is placed in fluid communication with the vacuum source or the compressed air source respectively.

10. The method of claim 8, wherein the at least one seat further comprises an annular gasket.

11. The method of claim 8, wherein the one or more outflow holes defined by the horizontal surface are flared at their top end.

12. The method of claim 8, wherein the apparatus further comprises one or more cutters associated with the upper bell member for separating away portion of the film sealed against the package, the one or more cutters, the one or more presses, and the sealing unit being independently traversable of the upper bell member via being connected to a plate associated with and independently traversable of the upper bell member.

13. The method of claim 8, wherein the sealing unit comprises a heat welder.

14. The method of claim 8, wherein the first period of time ends before the start of the second period of time and the third period of time starts before the end of the second period of time.

15. The method of claim 8, wherein the traversal of the one or more presses and of the sealing unit takes place at the end of the third period of time.

16. The method of claim 8, wherein the sum of the sections of the outflow holes is less than the sum of the sections of the first openings and of the slots, and the sum of the sections of the first openings and of the slots is greater than the sum of the sections of the second openings.

* * * * *